United States Patent
Daeffler et al.

(10) Patent No.: US 11,603,490 B2
(45) Date of Patent: Mar. 14, 2023

(54) AQUEOUS SOLUTION AND METHOD FOR USE THEREOF

(71) Applicant: SCHLUMBERGER TECHNOLOGY CORPORATION, Sugar Land, TX (US)

(72) Inventors: Christopher Daeffler, Houston, TX (US); Olga Nevvonen, Koltsovo (RU); Mohan Kanaka Raju Panga, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/236,767

(22) Filed: Apr. 21, 2021

(65) Prior Publication Data

US 2021/0238474 A1 Aug. 5, 2021

Related U.S. Application Data

(63) Continuation of application No. 15/070,350, filed on Mar. 15, 2016, now abandoned.

(51) Int. Cl.
 *C09K 8/74* (2006.01)
 *C09K 8/54* (2006.01)

(52) U.S. Cl.
 CPC ............. *C09K 8/74* (2013.01); *C09K 8/54* (2013.01); *C09K 2208/32* (2013.01)

(58) Field of Classification Search
 CPC ......... C09K 2208/32; C09K 8/54; C09K 8/74
 See application file for complete search history.

(56) References Cited

U.S. PATENT DOCUMENTS

| | | | |
|---|---|---|---|
| 3,826,312 A | 7/1974 | Richardson et al. | |
| 5,126,059 A * | 6/1992 | Williamson | C09K 8/78 507/260 |
| 7,938,912 B1 | 5/2011 | MacDonald | |
| 8,163,102 B1 | 4/2012 | MacDonald | |
| 8,430,971 B1 | 4/2013 | MacDonald | |
| 8,580,047 B1 | 11/2013 | MacDonald | |
| 8,784,573 B1 | 7/2014 | MacDonald, III | |
| 2015/0034318 A1 * | 2/2015 | Jiang | C09K 8/04 166/300 |

OTHER PUBLICATIONS

Warner, "The Kinetics of Hydrolysis of Urea and of Arginine", J. Biol. Chem., 1942, vol. 142, pp. 705-723.
Shaw et al., "The Decomposition of Urea in Aqueous Media", J. Am. Chem. Coc., 1955, vol. 77, pp. 4729-4733.
Ogata et al., "Kinetics of the Condensation of Urea with acetaldehyde", J. Org. Chem., 1965, vol. 30, pp. 1636-1639.

* cited by examiner

*Primary Examiner* — Alicia Bland

(57) ABSTRACT

An aqueous solution is disclosed including water, an acid, a nitrogen-containing compound, and a functionalizing agent (FA), which can be a ketone, diketone, aldehyde, dialdehyde, organic acid, and combinations thereof. An additional aqueous solution is disclosed including water, an acid, and an acid neutralizing agent which can be a reaction product of at least a portion of the nitrogen-containing compound and the functionalizing agent. Methods of treating a formation are also disclosed including treating a formation fluidly coupled to a wellbore with an oilfield treatment fluid comprising either or both of the aqueous solutions.

5 Claims, 3 Drawing Sheets

AQUEOUS SOLUTION AND METHOD FOR USE THEREOF

CROSS-REFERENCE TO RELATED APPLICATIONS

This application claims the benefit of U.S. Non-Provisional application Ser. No. 15/070,350 filed Mar. 15, 2016, the disclosure of which is incorporated herein by reference.

BACKGROUND

Field

The disclosure generally relates to aqueous solutions and methods of using such in treating subterranean formations. The disclosure also relates to aqueous solutions including water, an acid, a nitrogen-containing compound, and a functionalizing agent (FA), which can be a ketone, diketone, aldehyde, dialdehyde, organic acid, and combinations thereof, and also relates to an aqueous solution including water, an acid, and an acid neutralizing agent which can be a reaction product of the nitrogen-containing compound and the functionalizing agent.

The statements in this section merely provide background information related to the present disclosure and may not constitute prior art.

Description of the Related Art

The maintenance and stimulation of oil and gas wells with specially designed fluids is useful for the efficient utilization of these resources. Acid treatment is often considered the oldest well stimulation technology, having first been applied in 1895. When injected at low rates into carbonate formations, hydrochloric acid (HCl) can form conductive wormholes that extend radially from the well bore. Acids can also be injected into subterranean formation at rates high enough to cause fracturing. In this case, the acid unevenly dissolves the walls of the fracture, so that when the injection is stopped and the fracture closes, conductive channels to the well remain. Although oilfield acids are most visibly deployed as the major player in the stimulation fluid, they also have a role as the first fluid into the well during a hydraulic fracturing stage. This 'acid spearhead' helps clear blockages from cementing and perforating activities and dissolves carbonate components of the reservoir near the wellbore. The acid spearhead is often the fluid to initiate the fracture before pad and proppant stages are pumped.

Formations with well-understood geophysical stresses generally allow for smooth, problem-free acid or hydraulic fracturing treatments. This in not always the case in more complicated formations, and the available equipment might not be able to initiate the fracture. As acid is most likely the fluid to initiate a fracture in both acid and hydraulic fracturing, failed fracture initiation will leave a large amount of acid in the wellbore, a potentially corrosive condition for any metallic components.

It is generally known that hydrolyzable compounds can be used to release an amine that will neutralize the acid and reduce the corrosion rate. One such class of compounds is urea and its derivatives. The urea functional group is susceptible to hydrolysis at all levels of aqueous acidity/alkalinity, decomposing to two equivalents of ammonia and one equivalent of carbon dioxide (see equation 1). Urea hydrolysis, and therefore the rate at which the acid is neutralized, is dependent on temperature, proton concentration and urea concentration.

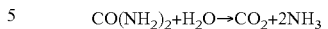

$$CO(NH_2)_2 + H_2O \rightarrow CO_2 + 2NH_3$$

Subterranean conditions, completion metallurgies and fracturing job designs vary greatly, thus it becomes desirable to have a means to control the rate of neutralization of acid. The urea-type compounds described above may in some cases and formation conditions hydrolyze too quickly, resulting in premature acid neutralization. Accordingly, there is a need for nitrogen-containing compounds which are more resistant to hydrolysis and which thus provide for more delayed and controlled acid neutralization.

SUMMARY

An aqueous solution includes:

i) water, ii) an acid, iii) a nitrogen-containing compound of formula I:

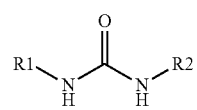

wherein R1 and R2 can be the same or different and are each selected from the group consisting of an alkyl group having from 1 to 6 carbon atoms, a cycloalkyl group, an aryl group, and hydrogen; and iv) a functionalizing agent (FA) selected from the group consisting of formula II, formula III, formula IV, and combinations thereof:

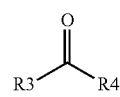

wherein R3 is selected from the group consisting of an alkyl group having from 1 to 6 carbon atoms, a cycloalkyl group, an aryl group, and hydrogen; R4 is selected from the group consisting of an alkyl group having from 1 to 6 carbon atoms, a cycloalkyl group, and an aryl group;

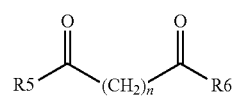

wherein R5 and R6 can be the same or different and are each selected from the group consisting of an alkyl group having from 1 to 6 carbon atoms, a cycloalkyl group, an aryl group, and hydrogen; n ranges from 0 to 3; and

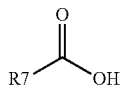
(IV)

wherein R7 is selected from the group consisting of an alkyl group having from 1 to 6 carbon atoms, a cycloalkyl group, an aryl group, and hydrogen.

An aqueous solution includes:
i) water,
ii) an acid, and
v) an acid neutralizing agent selected from the group consisting of formula V, formula VI, formula VII, and combinations thereof:

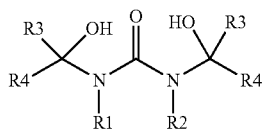
(V)

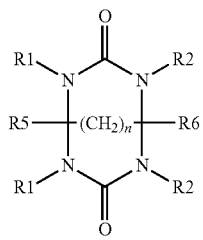
(VI)

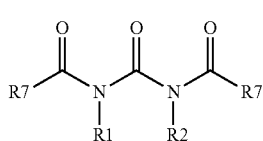
(VII)

wherein R1 and R2 can be the same or different and are each selected from the group consisting of an alkyl group having from 1 to 6 carbon atoms, a cycloalkyl group, an aryl group, and hydrogen; R3 is selected from the group consisting of an alkyl group having from 1 to 6 carbon atoms, a cycloalkyl group, an aryl group, and hydrogen; R4 is selected from the group consisting of an alkyl group having from 1 to 6 carbon atoms, a cycloalkyl group, and an aryl group; R5 and R6 can be the same or different and are each selected from the group consisting of an alkyl group having from 1 to 6 carbon atoms, a cycloalkyl group, an aryl group, and hydrogen; and R7 is selected from the group consisting of an alkyl group having from 1 to 6 carbon atoms, a cycloalkyl group, an aryl group, and hydrogen.

A method of treating a formation includes treating a formation fluidly coupled to a wellbore with an oilfield treatment fluid comprising aqueous solutions described herein.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION

Figure 1:
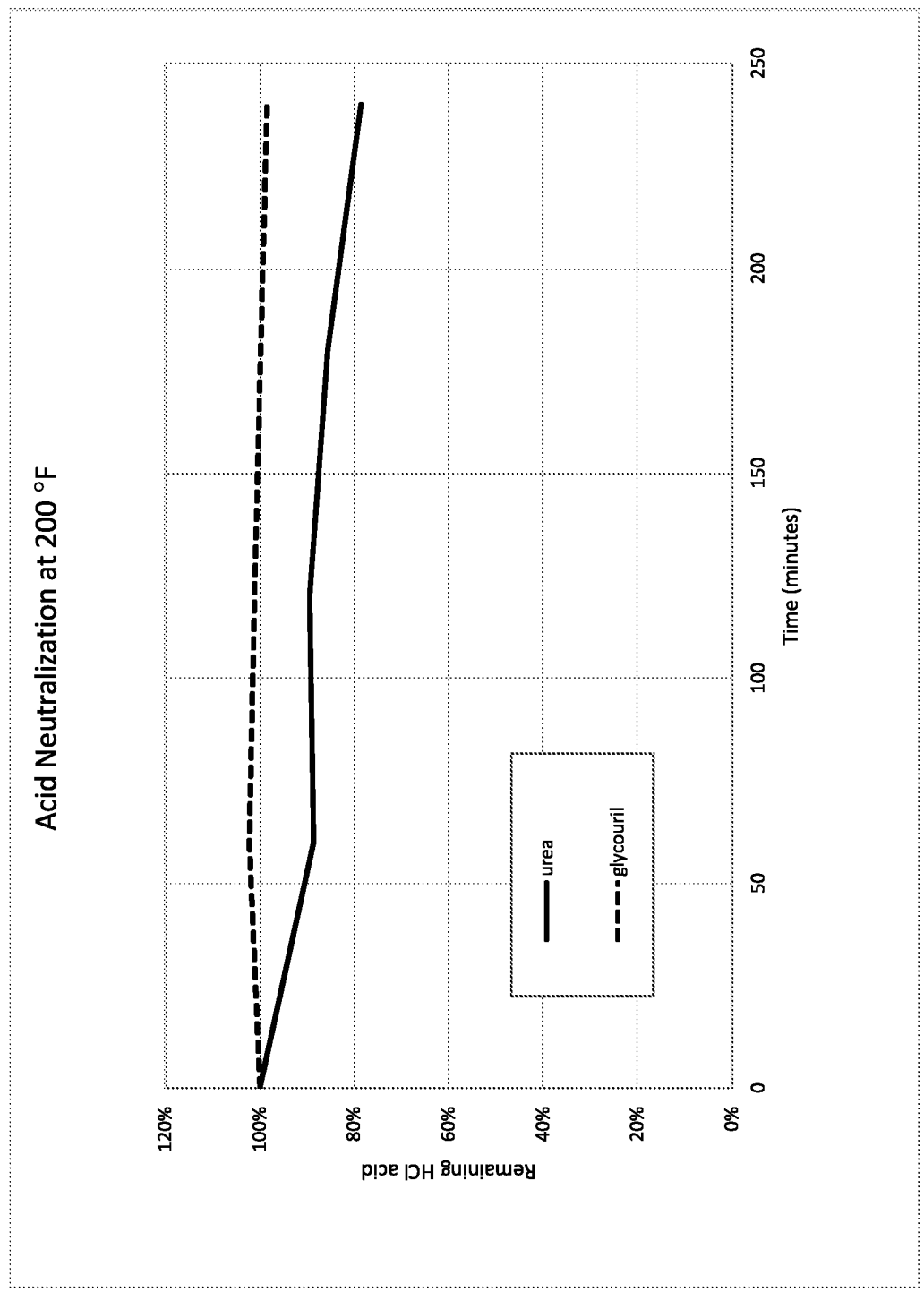
FIG. 1 depicts illustrative data showing HCl concentrations over time for an HCl and urea solution and an HCl and glycoluril solution, each at 200° F.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the compositions used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that the Applicant appreciates and understands that any and all data points within the range are to be considered to have been specified, and that the Applicant possessed knowledge of the entire range and all points within the range.

The term formation as utilized herein should be understood broadly. A formation includes any underground fluidly porous formation, and can include without limitation any oil, gas, condensate, mixed hydrocarbons, paraffin, kerogen, water, and/or $CO_2$ accepting or providing formations. A formation can be fluidly coupled to a wellbore, which may be an injector well, a producer well, and/or a fluid storage well. The wellbore may penetrate the formation vertically, horizontally, in a deviated orientation, or combinations of these. The formation may include any geology, including at least a sandstone, limestone, dolomite, shale, tar sand, and/or unconsolidated formation. The wellbore may be an individual wellbore and/or a part of a set of wellbores directionally deviated from a number of close proximity surface wellbores (e.g. off a pad or rig) or single initiating wellbore that divides into multiple wellbores below the surface.

The term "oilfield treatment fluid" as utilized herein should be understood broadly. In certain embodiments, an oilfield treatment fluid includes any fluid having utility in an oilfield type application, including a gas, oil, geothermal, or injector well. In certain embodiments, an oilfield treatment fluid includes any fluid having utility in any formation or wellbore described herein. In certain embodiments, an oilfield treatment fluid includes a matrix acidizing fluid, acid fracturing fluid, a wellbore cleanup fluid, a pickling fluid, a near wellbore damage cleanup fluid, a surfactant treatment fluid, an unviscosified fracture fluid (e.g. slick water fracture fluid), and/or any other fluid consistent with the fluids otherwise described herein. An oilfield treatment fluid may include any type of additive known in the art, which are not listed herein for purposes of clarity of the present description, but which may include at least friction reducers, inhibitors, surfactants and/or wetting agents, fluid diverting agents, particulates, acid retarders (except where otherwise provided herein), organic acids, chelating agents, energizing agents (e.g. $CO_2$ or N2), gas generating agents, solvents, emulsifying agents, flowback control agents, resins, breakers, and/or non-polysaccharide based viscosifying agents.

The term "treatment concentration" as utilized herein should be understood broadly. A treatment concentration in the context of an HCl concentration is a final concentration of the fluid before the fluid is positioned in the wellbore and/or the formation for the treatment. The treatment concentration may be the mix concentration available from the HCl containing fluid at the wellsite or other location where the fluid is provided from. The treatment concentration may be modified by dilution before the treating and/or during the treating. Additionally, the treatment concentration may be modified by the provision of additives to the fluid. In certain embodiments, a treatment concentration is determined upstream of additives deliver (e.g. at a blender, hopper, or mixing tub) and the concentration change from the addition of the additives is ignored. In certain embodiments, the treatment concentration is a liquid phase or acid phase concentration of a portion of the final fluid—for example when the fluid is an energized or emulsified fluid.

The aqueous solution can comprise: i) water, ii) an acid, iii) a nitrogen-containing compound of formula I:

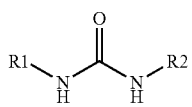

(I)

wherein R1 and R2 can be the same or different and are each selected from the group consisting of an alkyl group having from 1 to 6 carbon atoms, a cycloalkyl group, an aryl group, and hydrogen; and iv) a functionalizing agent (FA) selected from the group consisting of formula II, formula III, formula IV, and combinations thereof:

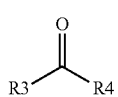

(II)

wherein R3 is selected from the group consisting of an alkyl group having from 1 to 6 carbon atoms, a cycloalkyl group, an aryl group, and hydrogen; R4 is selected from the group consisting of an alkyl group having from 1 to 6 carbon atoms, a cycloalkyl group, and an aryl group;

(III)

wherein R5 and R6 can be the same or different and are each selected from the group consisting of an alkyl group having from 1 to 6 carbon atoms, a cycloalkyl group, an aryl group, and hydrogen; n ranges from 0 to 3; and

(IV)

wherein R7 is selected from the group consisting of an alkyl group having from 1 to 6 carbon atoms, a cycloalkyl group, an aryl group, and hydrogen.

The acid can be selected from the group consisting of hydrochloric acid, hydrobromic acid, hydroiodic acid, hydrofluoric acid, sulfuric acid, nitric acid, phosphoric acid, alkanesulfonic acids, arylsulfonic acids, acetic acid, formic acid, alkyl carboxylic acids, acrylic acid, lactic acid, glycolic acid, malonic acid, fumaric acid, citric acid, tartaric acid, and combinations thereof. The FA can be a ketone, diketone, aldehyde, dialdehyde, organic acid, and combinations thereof.

Water is present in the aqueous solution at least in an amount sufficient to dissolve the acid, the nitrogen-containing compound, and the functionalizing agent. For HCl as the acid, HCl can be present in an amount of at least about 7.5 wt % and up to about 45.7 wt %, or at least about 10 wt % and up to about 36 wt %, or at least about 15 wt % and up to about 36 wt %, or at least about 15 wt % and up to about 28 wt %, at least about 20 wt % and up to about 36 wt %, or at least about 28 wt % and up to about 45.7 wt %.

For HCl as the acid and urea as the nitrogen-containing compound, the molar ratio of the FA:nitrogen containing compound can be from about 0.1 to about 2, or from about 0.2 to about 1.5, or from about 0.5 to about 1. Also, the molar ratio of the nitrogen-containing compound:acid can be from about 0.1 to about 2.4, or from about 0.2 to about 2, or from about 0.5 to about 1.

The aqueous solution can comprise: i) water, ii) an acid, and iii) an acid neutralizing agent selected from the group consisting of formula V, formula VI, formula VII, and combinations thereof:

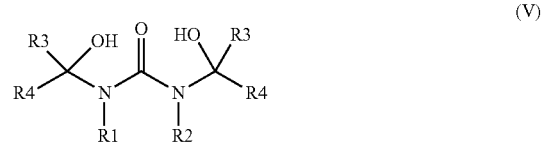

(V)

-continued

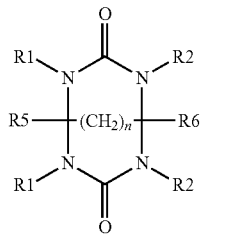
(VI)

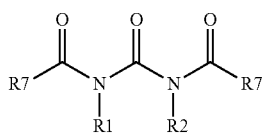
(VII)

wherein R1 and R2 can be the same or different and are each selected from the group consisting of an alkyl group having from 1 to 6 carbon atoms, a cycloalkyl group, an aryl group, and hydrogen; R3 is selected from the group consisting of an alkyl group having from 1 to 6 carbon atoms, a cycloalkyl group, an aryl group, and hydrogen; R4 is selected from the group consisting of an alkyl group having from 1 to 6 carbon atoms, a cycloalkyl group, and an aryl group; R5 and R6 can be the same or different and are each selected from the group consisting of an alkyl group having from 1 to 6 carbon atoms, a cycloalkyl group, an aryl group, and hydrogen; and R7 is selected from the group consisting of an alkyl group having from 1 to 6 carbon atoms, a cycloalkyl group, an aryl group, and hydrogen.

The acid can be selected from the group consisting of hydrochloric acid, hydrobromic acid, hydroiodic acid, hydrofluoric acid, sulfuric acid, nitric acid, phosphoric acid, alkanesulfonic acids, arylsulfonic acids, acetic acid, formic acid, alkyl carboxylic acids, acrylic acid, lactic acid, glycolic acid, malonic acid, fumaric acid, citric acid, tartaric acid, and combinations thereof. The FA can be a ketone, diketone, aldehyde, dialdehyde, organic acid, and combinations thereof.

The acid neutralizing agent can be prepared from the reaction of i) at least a portion of a nitrogen-containing compound in accordance with formula I set out above, with ii) a functionalizing agent (FA) selected from the group consisting of formula II, formula III, formula IV, and combinations thereof, as set out above. The following shows such reaction mechanisms.

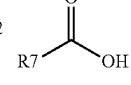

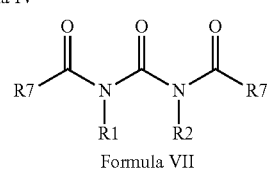

Water is present in the aqueous solution at least in an amount sufficient to dissolve the acid, and the acid neutralizing agent. For HCl as the acid, HCl can be present in an amount of at least about 7.5 wt % and up to about 45.7 wt %, or at least about 10 wt % and up to about 36 wt %, or at least about 15 wt % and up to about 36 wt %, or at least about 15 wt % and up to about 28 wt %, at least about 20 wt % and up to about 36 wt %, or at least about 28 wt % and up to about 45.7 wt %. For HCl as the acid and urea as the nitrogen-containing compound, the molar ratio of the acid neutralizing agent:acid can be from about 0.1 to about 1.2, or from about 0.25 to about 1, or from about 0.5 to about 0.6.

Also, as a further embodiment, the aqueous solution does not include an additional acid neutralizing agent.

A method of treating a formation comprises a) preparing an aqueous solution in accordance with the aqueous solutions described herein, which can also be any combination of the aqueous solutions described herein; and b) treating a formation fluidly coupled to a wellbore with an oilfield treatment fluid comprising the aqueous solution.

The formation can also include a temperature of greater than about 225° F. (107° C.), or greater than about 250° F. (121° C.), or greater than about 290° F. (143° C.).

In certain embodiments, the aqueous solutions described herein can additionally include an amount of hydrofluoric acid (HF). HF exhibits distinct reactions from HCl, and is useful in certain applications to enhance the activity of the resulting aqueous solution. For example, HF is utilized in the cleanup of sandstone formations where HCl alone is not effective for removing certain types of formation damage. It is believed that the present aqueous solution will complex with HF similarly to the observed effects with HCl. Accordingly, solutions can be formulated with a total acid amount that is much higher than presently attainable formulations. In certain embodiments, the HF is present in an amount of at least 0.25% by weight. The HF may be present in an amount of up to 2%, up to 6%, up to 10%, up to 15%, or greater amounts. For HCl as the acid, the HF may be present in addition to the amount of HCl, and/or as a substitution for an amount of the HCl.

Examples

Figure 2:
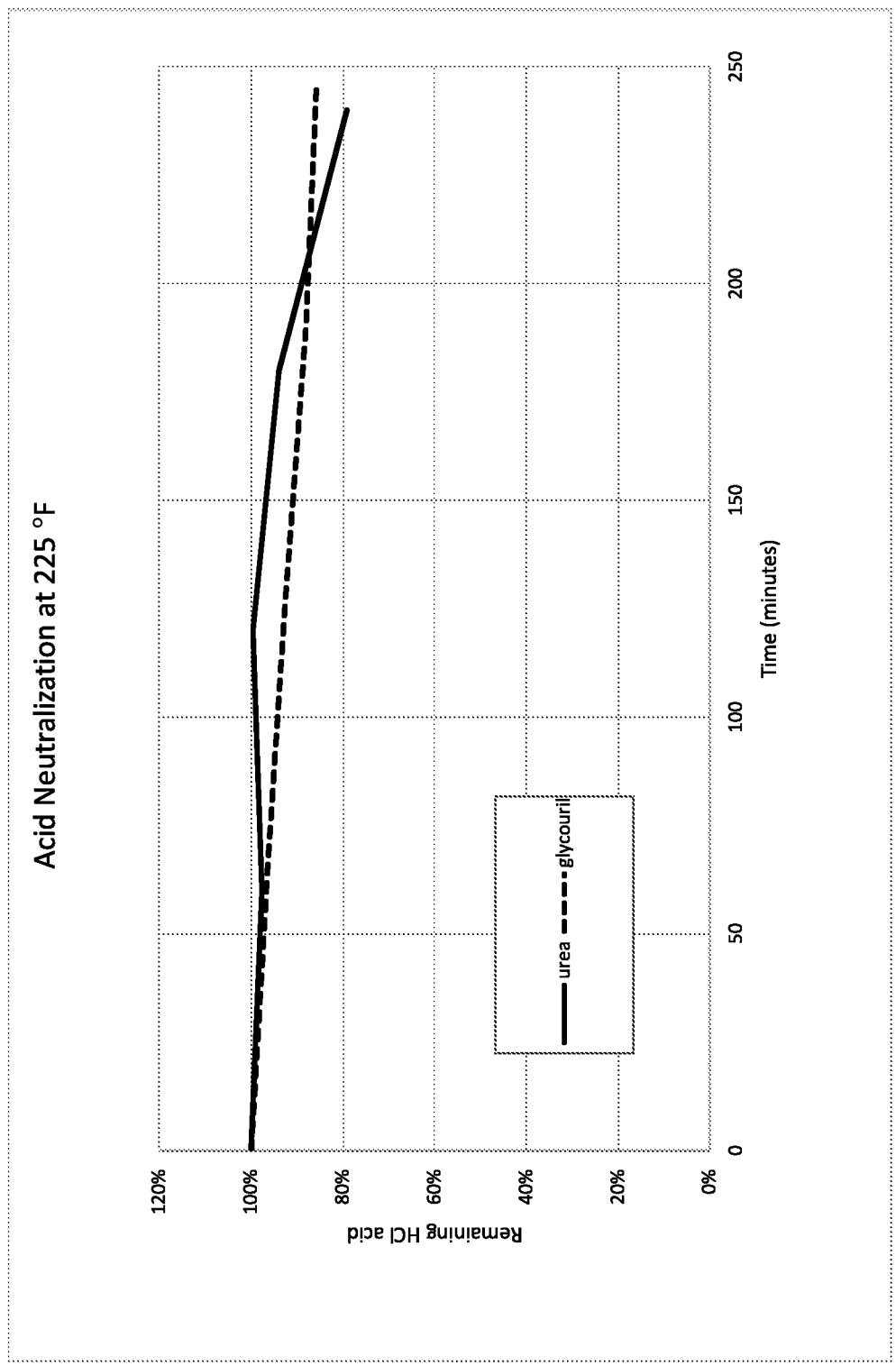
FIG. 2 depicts illustrative data showing HCl concentrations over time for an HCl and urea solution and an HCl and glycoluril solution, each at 225° F.
Figure 3:
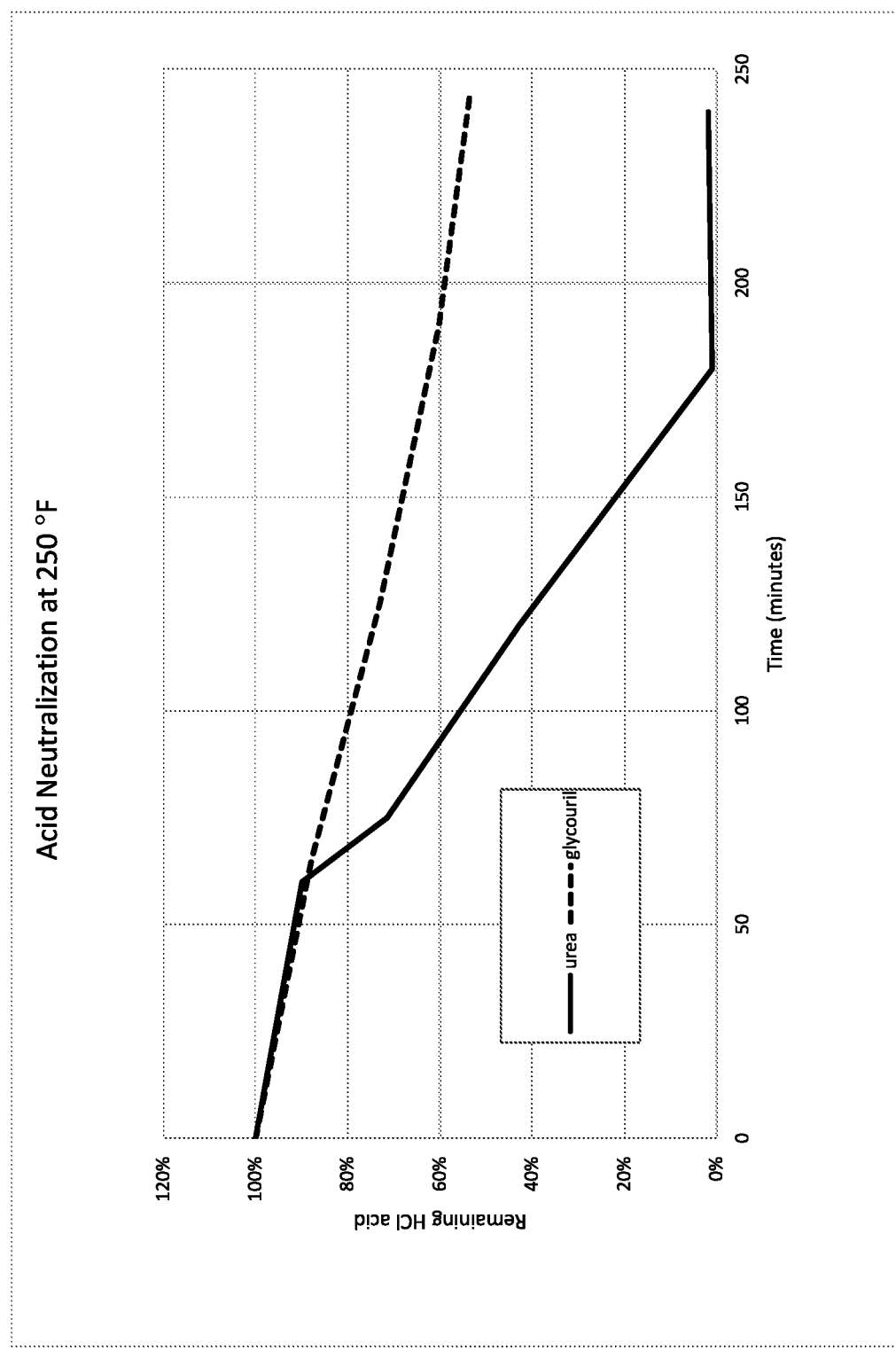
FIG. 3 depicts illustrative data showing HCl concentrations over time for an HCl and urea solution and an HCl and glycoluril solution, each at 250° F.

A stock solution containing hydrochloric acid (15% by weight, 1 equiv.), urea (12.4% by weight, 0.5 equiv) and glyoxal (6% by weight, 0.25 equiv) was prepared. The solution was initially yellow and turned to orange over time. The stock solution was aliquotted into several vials. The vials were sealed with a PTFE/silicone disc held in place by an aluminum crimp. The vials were simultaneously heated in an oil bath at the desired temperature. The vials were removed one-by-one at intervals, cooled, and titrated with a sodium hydroxide solution (10% by weight). The results at 200° F., 225° F. and 250° F. are shown in FIGS. 1-3. Control experiments without glyoxal were also performed.

As shown in FIGS. 1 and 3, the addition of glyoxal and urea (forming glycoluril) to a hydrochloric acid solution certainly slowed the neutralization of the HCl acid at each of the temperatures 200° F. and 250° F., most markedly at 250° F., as compared to the urea and HCl solution without added glyoxal. FIG. 2 shows similar behavior for the glyoxal containing solution as compared to the glyoxal-free HCl and urea solution. Should such a fluid be injected as an acid spearhead, this would increase its operational envelope.

As is evident from the figures and text presented above, a variety of embodiments according to the present disclosure are contemplated.

While the disclosure has provided specific and detailed descriptions to various embodiments, the same is to be considered as illustrative and not restrictive in character. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

Moreover, in reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A method of treating a formation, comprising:
    (a) preparing an aqueous solution comprising:
        water;
        an acid;
        a nitrogen-containing compound comprising urea; and
        a functionalizing agent (FA) comprising glyoxal;
        wherein the urea and the glyoxal react to form glycoluril in the aqueous solution; and
    (b) after preparing the aqueous solution, treating a formation fluidly coupled to a wellbore with an oilfield treatment fluid comprising the aqueous solution.

2. The method of claim 1, wherein the acid is selected from the group consisting of hydrochloric acid, hydrobromic acid, hydroiodic acid, hydrofluoric acid, sulfuric acid, nitric acid, phosphoric acid, alkanesulfonic acids, arylsulfonic acids, acetic acid, formic acid, alkyl carboxylic acids, acrylic acid, lactic acid, glycolic acid, malonic acid, fumaric acid, citric acid, tartaric acid, and combinations thereof.

3. The method of claim 1, wherein a molar ratio of glyoxal:urea is from about 0.1 to about 2.

4. The method of claim 1, wherein a molar ratio of urea:acid is from about 0.1 to about 2.4.

5. The method of claim 1, wherein a formation temperature is higher than about 225° F. (107° C.).

\* \* \* \* \*